United States Patent
Malvankar et al.

(10) Patent No.: US 12,455,772 B2
(45) Date of Patent: Oct. 28, 2025

(54) ALLOCATING COMPUTING RESOURCES USING A MACHINE LEARNING MODEL

(71) Applicant: INTERNATIONAL BUSINESS MACHINES CORPORATION, Armonk, NY (US)

(72) Inventors: Abhishek Malvankar, White Plains, NY (US); Alaa S. Youssef, Valhalla, NY (US); Chen Wang, Chappaqua, NY (US); Diana Jeanne Arroyo, Austin, TX (US); Marquita May Ellis, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 18/149,654

(22) Filed: Jan. 3, 2023

(65) Prior Publication Data
US 2024/0220329 A1 Jul. 4, 2024

(51) Int. Cl.
*G06F 9/50* (2006.01)
*G06N 3/092* (2023.01)

(52) U.S. Cl.
CPC ............ *G06F 9/505* (2013.01); *G06F 9/5038* (2013.01); *G06N 3/092* (2023.01)

(58) Field of Classification Search
CPC ...... G06F 9/505; G06F 9/5038; G06F 9/5027; G06F 2209/506; G06N 3/092
See application file for complete search history.

(56) References Cited

U.S. PATENT DOCUMENTS

| 9,412,075 B2 | 8/2016 | Padala et al. |
| 9,547,534 B2 | 1/2017 | Dettori et al. |
| 9,571,347 B2 | 2/2017 | Siddiqui et al. |

(Continued)

FOREIGN PATENT DOCUMENTS

| CN | 111767991 A | 10/2020 |
| EP | 3126975 B1 | 3/2019 |

OTHER PUBLICATIONS

Gari, Y. et al., "Reinforcement Learning-based Application Autoscaling in the Cloud: A Survey"; arXiv:2001.09957v3 [cs.DC] (2020), 40 pgs.

(Continued)

*Primary Examiner* — Sisley N Kim
(74) *Attorney, Agent, or Firm* — CHIP LAW GROUP

(57) ABSTRACT

A method and system allocating computing resources according to a trained machine learning model that includes receiving a request to accommodate a particular workload that involves a first threshold amount of computing resources implemented by at least one computing cluster. An identified a set of computing clusters, that have computing resources available for allocating from the identified set of computing clusters to the at least one computing cluster to satisfy the first threshold amount of computing resources, is received from a database. A trained deep-reinforcement learning model is applied to generate a policy for allocating the available computing resources from the identified set of computing clusters to the at least one computing cluster. It is verified that the generated policy satisfies a threshold according to one or more predetermined criteria. The computing resources are allocated from the set of computing clusters to the at least one computing cluster.

20 Claims, 9 Drawing Sheets

(56) References Cited

U.S. PATENT DOCUMENTS

| | | | |
|---|---|---|---|
| 10,476,949 B2 | 11/2019 | Marchetti et al. | |
| 10,567,260 B2* | 2/2020 | Wu | H04L 41/0895 |
| 10,581,964 B2 | 3/2020 | Einkauf et al. | |
| 10,936,238 B2 | 3/2021 | Power et al. | |
| 10,942,781 B2 | 3/2021 | Ding et al. | |
| 10,990,282 B1 | 4/2021 | Lee et al. | |
| 11,201,784 B2 | 12/2021 | Peng et al. | |
| 2019/0325304 A1 | 10/2019 | Gottin et al. | |
| 2019/0325370 A1* | 10/2019 | Das | G06F 11/3452 |
| 2019/0363950 A1* | 11/2019 | Li | H04L 41/147 |
| 2021/0157644 A1* | 5/2021 | Unnikrishnan | G06F 9/5072 |

OTHER PUBLICATIONS

Authors et. al.: Disclosed Anonymously, "Cloud Resource Allocation", IP.com No. IPCOM000264294D (2020), 5 pgs.

Authors et. al.: Disclosed Anonymously, "Automatic Selection of Resource Set for Cloud Native Applications", IP.com No. IPCOM000264895D (2021), 5 pgs.

Authors et. al.: Disclosed Anonymously, "Cognitive Cloud Brokerage Policy Recommendation to Inter-Cloud Broker for Hybrid Cloud Networks", IP.com No. IPCOM000268159D (2021), 7 pgs.

Liu, Z. et al., "A Reinforcement Learning Based Resource Management Approach for Time-critical Workloads in Distributed Computing Environment"; IEEE (2018), 10 pgs.

Wei, X. et al., "RLConfig: Run-time Configuration of Cluster Schedulers via Deep Reinforcement Learning", IEEE (2021), 8 pgs.

Xu, J. et al., "Deep Reinforcement Learning Based Resource Allocation Strategy in Cloud-Edge Computing System", Frontiers in Bioengineering and Biotechnology (2022), 14 pgs.

Paramsivapandi, S. K. et al., "Machine Learning based Hybrid Recurrent Data-Driven Flow Algorithm of Identify the Risk of Data Flow Error Detection in Cloud Computing", International Journal for Research in Applied Science & Engineering Technology (2021), vol. 9:II, 9 pgs.

Authors et. al.: Disclosed Anonymously, "System and method to optimize multicloud resources and policy preparations", IP.com No. IPCOM000263144D, Aug. 2, 2020, 06 pages.

Imdoukh et al., "Machine learning-based auto-scaling for containerized applications", Neural Computing and Applications, Oct. 8, 2019, 16 pages, https://link.springer.com/article/10.1007/s00521-019-04507-z.

* cited by examiner

| User ID | Workload Type | Max Workers | Min Workers | Duration In Mins | Account Priority | Namespace | Max Total CPU | Max Total GPU | Max Total Memory in GB | Pending Pods | App Name |
|---|---|---|---|---|---|---|---|---|---|---|---|
| 1234 | train | 10 | 1 | 60 | high | uuid-1234 | 10 | 10 | 10 | 0 | ray |
| 5678 | inference | 20 | 2 | 1800 | medium | uuid-5678 | 20 | 2 | 10 | 5 | pytorch-nlp |
| 91011 | CPU | 100 | 10 | 90 | low | uuid-91011 | 10 | 0 | 100 | 20 | game |

ALLOCATING COMPUTING RESOURCES USING A MACHINE LEARNING MODEL

BACKGROUND

Technical Field

The present disclosure generally relates to data processing, and more particularly, to systems and methods of machine learning techniques.

Description of the Related Art

Machine learning is a subfield of artificial intelligence directed to training a computer system to learn relationships between disparate data sources. Through training, a computer system may gradually improve relationship identification. Another subfield of artificial intelligence is deep reinforcement learning, which uses statistical methods to make classifications or predictions based on a status of an environment including at least one agent, a reward for the agent selecting a particular action, and the action taken. Over time, agents may develop a trained deep reinforcement learning model that predicts actions that closely align with a target action.

SUMMARY

According to an embodiment of the present disclosure, a method of allocating computing resources between computing clusters according to a policy generated using a trained machine learning model is provided. A request is received to accommodate a particular workload that involves a first threshold amount of computing resources implemented by at least one computing cluster. Receiving an identified set of computing clusters that have computing resources available for allocating from the identified set of computing clusters to the at least one computing cluster to satisfy the first threshold amount of computing resources. A trained deep-reinforcement learning model is applied operative to generate a policy for allocating the available computing resources from the identified set of computing clusters to the at least one computing cluster. The method includes verifying that the generated policy satisfies a second threshold according to a predetermined criteria. The computing resources are allocated from the set of computing clusters to the at least one computing cluster.

According to an embodiment of the disclosure, a computing system having one or more processors, one or more computer-readable memories, one or more non-transitory computer-readable storage devices, and program instructions stored on at least one of the one or more non-transitory storage devices for execution by at least one of the one or more processors via at least one of the one or more memories is provided. The computing system is capable of performing a method that includes allocating computing resources between computing clusters according to a policy generated using a trained machine learning model. A request is received to accommodate a particular workload that involves a first threshold amount of computing resources implemented by at least one computing cluster. An identified a set of computing clusters, that have computing resources available for allocating from the identified set of computing clusters to the at least one computing cluster to satisfy the first threshold amount of computing resources, is received from a database. A trained deep-reinforcement learning model is applied to generate a policy for allocating the available computing resources from the identified set of computing clusters to the at least one computing cluster. It is verified whether the generated policy satisfies a second threshold according to one or more predetermined criteria. The computing resources are allocated from the set of computing clusters to the at least one computing cluster.

According to an embodiment of the present disclosure, a computer program product includes one or more non-transitory computer-readable storage devices and program instructions stored on at least one of the one or more non-transitory storage devices. The program instructions are executable by a processor, the program instructions including instructions to allocate computing resources between computing clusters according to a policy generated using a trained machine learning model. A user request is received to accommodate a particular workload that involves a first threshold amount of computing resources implemented by at least one computing cluster. An identified set of computing clusters, that have computing resources available for allocating from the identified set of computing clusters to the at least one computing cluster to satisfy the first threshold amount of computing resources, is received from a database. A trained deep-reinforcement learning model is applied to generate a policy for allocating the available computing resources from the identified set of computing clusters to the at least one computing cluster. It is verified that the generated policy satisfies a second threshold according to one or more predetermined criteria. The computing resources are allocated from the set of computing clusters to the at least one computing cluster.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 5 is an exemplary table illustrating example parameters for training a machine learning model, consistent with an illustrative embodiment.

DETAILED DESCRIPTION

Figure 1:
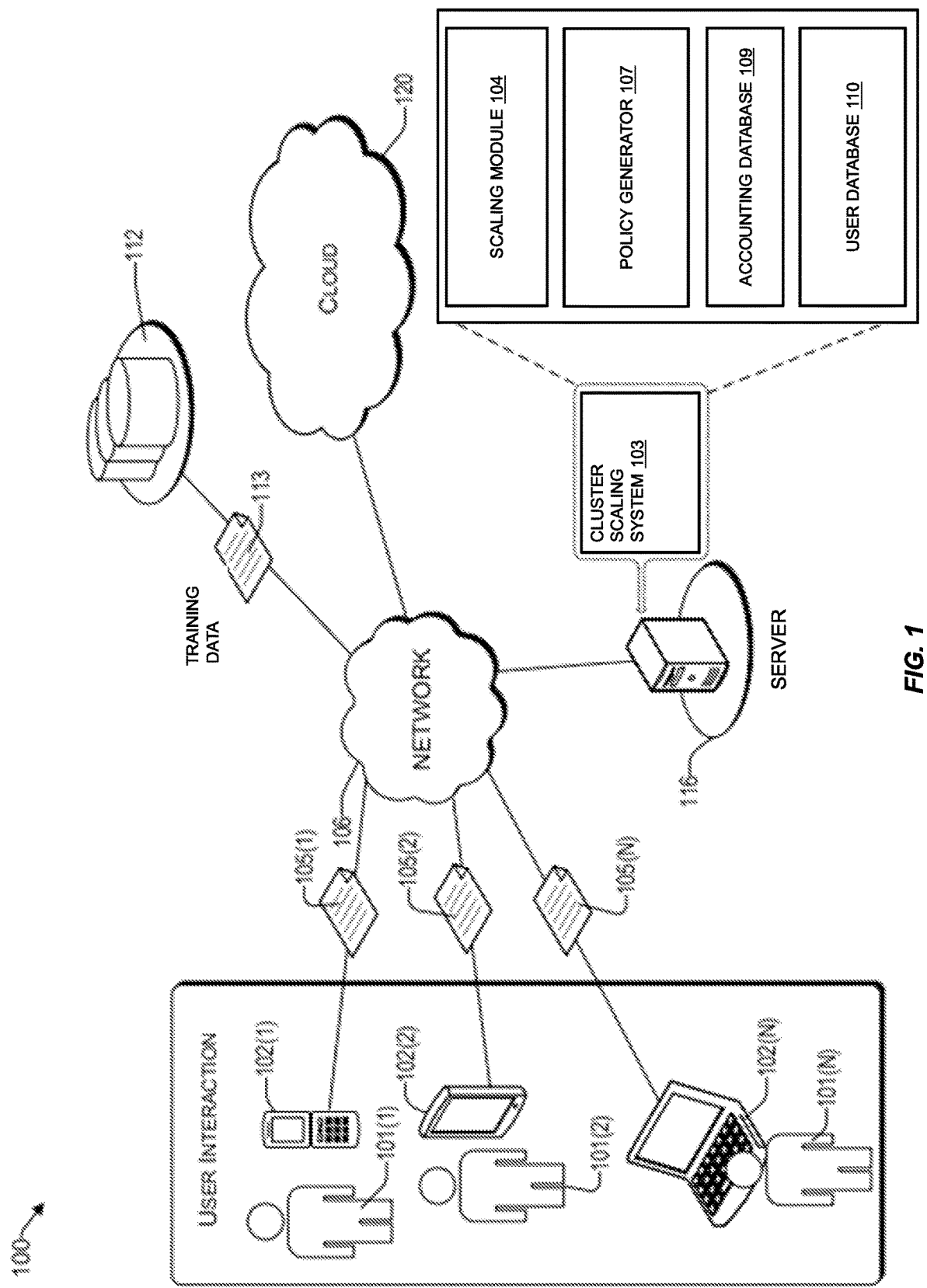
FIG. 1 is an example architecture of a system for generating inferential text using machine learning techniques, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

OVERVIEW

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods of using machine learning techniques, e.g., a deep reinforcement model, to scale computing clusters to accommodate a request for a computational workload or task to be performed on a computing platform (e.g., a cloud infrastructure, such a public, private, or hybrid cloud infrastructure). Currently, machine learning workloads usually run in a distributed fashion to complete training over multiple epochs to achieve target accuracy. Training over multiple epochs happens on a user defined cluster that submits tasks to available nodes in the clusters. Based on workloads demands (i.e., pending tasks) new resources (e.g., memory, processing power, and so on) are added to the cluster to match the demand which leads to user clusters being auto scaled.

In a shared cloud environment (e.g., a hybrid cloud environment) where multiple computational workloads or tasks are competing for autoscaling, it becomes very difficult (e.g., impossible) to enable each computational workload or task to scale to threshold (e.g., maximum, minimum, etc.) limits. There is a long felt need to identify select computational workloads or tasks to enable autoscaling while down scaling clusters of remaining computational workload or tasks in a shared computing environment. Existing systems use heuristics or threshold scores to provide autoscaling under different constraints. Further, existing systems help in autoscaling a single application or focuses on a single computational workload or task, and does not consider multiple competing computational workload, tasks, or multiple competing applications.

Advantageously, technical aspects of the present disclosure use machine learning techniques, such as deep reinforcement learning, to learn an optimal policy that solves issues, including identifying computational workload or tasks (e.g., associated with one or more user accounts) that involve scaling of at least one cluster associated with the computational workload or task by downscaling other clusters within the computing environment, without significantly impacting the other clusters current workload execution. Further, aspects of the present disclosure identify computational workloads or tasks that are allowed to scale cluster based, e.g., on a user account (e.g., associate with the computational workload or task) priority, and determine how to scale down resources from another cluster when multiple competing computational workload or tasks exists.

The issue of optimizing application execution in the cloud with autoscaling strategies can be addressed from different perspectives: execution of individual applications from different user account; execution of multiple application from the same user account; and, execution of multiple applications from multiple user accounts. Most approaches to the above issue are based on heuristics or meta-heuristics; deep reinforcement learning presents an avenue to learn policies to address the above issues.

Technical aspects of the present disclosure use deep reinforcement learning (DRL) to learn optimal policy that address the following issues. The first issue is identifying computational workloads or tasks associated with a user account, that desire additional computing resources (e.g., in the form of scaling of computing clusters) for a particular computational workload and receiving allocated computing resources by scaling other computing clusters that are not associated with the particular workload. Second, scaling other computing clusters not associated with the particular workload may involve downscaling computing clusters associated with other workloads and other users without significantly impacting current other workload execution.

Technical aspects of the present disclosure include a computing system receiving a request to accommodate a computational workload or task for an auto-scalable cluster relating to a particular workload, e.g., for an application running in a hybrid cloud environment. The computing system may invoke trained deep reinforcement learning models to apply a policy (e.g., learned from training data) that allocates computing resources between multiple competing computational workloads or tasks (associated with other user accounts) and competing computing resources. The deep reinforcement learning may have an optimization objective (i.e., a designed reward function that rewards clusters, or agents of a cluster, for a particular action given a particular state) to scale the computing cluster for the computational workload or task based on a predetermined priority associated with the user account of the computational workload or task. It should be noted that the terms "optimize," "optimal," and the like does not mean make perfect or 100%, but rather to perform at a high level and may be a goal an engineer, programmer, or scientist implementing technical aspects of the present disclosure desire to achieve. Further, optimize, optimal, and the like is from the perspective of someone of ordinary skill in the art.

The optimization objective may scale other clusters associated with applications, computational workloads, or tasks associated with other user accounts based on performance as an objective, without significantly impacting current application, computational workload, or task execution. Further, the deep reinforcement learning model may generate a policy that the computing system implements for the optimization goal, e.g., to allocate computing resources to the computing cluster associated with the computational workload or task corresponding to the user account. The computing system may verify or receive verification from a third party that the policy satisfies a criterion, including a threshold (e.g., maximum) limit for scaling to the cluster associated with the computational workload or task, a minimum down scaling from the other clusters so that the computational workload(s) or tasks associated with the other user accounts do not halt, and satisfies a total number of impacted clusters.

Upon the policy being verified, the computing system may downscale computing resources of at least one other cluster to satisfy computing resource requirements of the workload or tasks associated with the user account. In some examples, computing resources may be downscaled from certain computational workloads or tasks associated with a lower priority user account than those computational workloads or tasks associated with a higher priority user account, as discussed below. After the workloads from a prioritized user account are complete, the computing system may reallocate computing resources so that the computing resources are returned to the other clusters associated with the other user accounts.

Technical advantages over the current art that are addressed in the present disclosure include managing autoscaling of computing resources across multiple competing computational workloads or tasks. Further, technical advantages include using machine learning techniques (e.g., deep reinforcement learning) to generate a policy that optimizes: select high-priority user accounts (which are based on a predetermined criteria) to receive computing resources over low-priority user accounts, and providing adequate resources to the target application when multiple workload competes for resources from the same user account. In some examples, the computing system allocates computing resources between multiple computing clusters without significantly hampering workload execution capability of the scaled-down cluster. The technical aspects of the present disclosure outperform threshold-based and heuristics-based optimization to get a desired policy. Further, the deep reinforcement learning model is updated regarding scaling decisions made by the policy by receiving automated feedback.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other appropriately configured computing platforms. As discussed in detail below, the operational/functional language is to be read in its proper technological context, i.e., as concrete specifications for physical implementations.

Accordingly, one or more of the methodologies discussed herein may obviate a need for time consuming data processing by the computing system. Technical aspects of the present disclosure may have the technical effect of reducing computing resources used by one or more devices within the system. Examples of such computing resources include, without limitation, processor cycles, network traffic, memory usage, storage space, and power consumption.

Further, technical aspects of the present disclosure cannot be performed in the human mind or with paper and pen. For example, as discussed with reference to at least FIG. 1, the cluster-scaling system 103 receives a request to accommodate a computational workload or task, in the form of an electronic data package(s) 105(1)-(N), from at least one electronic device 102(1)-(N) (which may be located remotely) over a network 106. For example, each of the users 101(1)-(N) may request to increase computing resources to run an application. In another example, the request may be an automatic request not from a user 101(1)-(N). The cluster scaling system 103 can invoke a machine learning model (e.g., a trained deep reinforcement learning model) to generate a policy to downscale certain clusters and upscale the cluster associated with the computational workload or task. The cluster staling system may then scale the multiple clusters according to the generated policy. The details of the cluster scaling system are discussed below.

Although the present disclosure focuses on managing allocation of computing resources between clusters using a trained machine learning model, embodiments of the present disclosure extend to managing allocation of computing resources between virtual machines, containers, and so on. For example, a computing system (e.g., cluster scaling system 103) can be used to auto-scale a workload based on container, cluster, or virtual machine startup times. Graphical processing unit containers, virtual machines, or clusters may be tens of gigabytes (GBs) in size and may need to retrieve a dataset from a, e.g., cloud infrastructure to initiate or setup a node (e.g., a worker, agent, pending pod, and the like) to train a machine learning model (e.g., deep reinforcement learning model).

Retrieving images for GPU containers, virtual machines, or clusters and retrieving a dataset can be time-intensive. Technical aspects of the present disclosure could be added as new feature in an existing dataset to generate a policy based on the time it takes to spawn usable user container, virtual machine, or cluster. The system can be used to generate a desired policy based on usage cost as a new feature added to the dataset. A budget associated with a user account may be specified for running an experiment, e.g., as part of the workload request. Based on historical cost obtained from similar workloads, a current workload can be prioritized. Workloads with a higher budget can be given higher priority. A policy can also be generated based on a deadline, with computing resources requested, the deadline may also be specified (e.g., five minutes, an hour, a day, and so on) which can help in workload prioritization to allocate computing resources from auto-scaled workloads to the workload.

Example Architecture

FIG. 1 illustrates an example architecture of a system for carrying out technical aspects of the present disclosure. More specifically, FIG. 1 illustrates an example architecture 100 of a system for scaling clusters within a, e.g., hybrid computing environment, consistent with an illustrative embodiment. Architecture 100 may include one or more users 101(1) to 101(N) who can interact individually or collaboratively with interactive cluster scaling system 103 stored, (e.g., on a server 116). Cluster scaling system 103, can receive a request to accommodate a particular workload or task via a scaling module 104, invoke a policy generator 107 that uses a machine learning model (e.g., a deep reinforcement learning model) to generate a policy, e.g., by referring to an accounting database 109 that includes a status of computing resources within the cloud computing environment and a priority database 110 that includes a priority of the user relative to other users, verify the generated policy via policy verifier, and apply the policy by the scaling module 104.

Each user 101(1) to 101(N) can interact with the cluster scaling system 103 by way of sending and receiving electronic data packages 105(1) to 105(N) over a network 106.

The electronic data packages 105(1) to 105(N) may include the requests for completion of a particular computational workload within the cloud computing environment. In some examples, the requests for completion may not be sent by the user but automatically sent responsive to a particular workload exceeding a threshold number (e.g., maximum or minimum amount of computational resources) of nodes within a cluster that are deemed sufficient to complete the particular workload.

There is a network 106 that allows various user devices 102(1) to 102(N) to communicate with a data repository 112, server 116, and/or each other. Network 106 may be, without limitation, a local area network ("LAN"), a virtual private network ("VPN"), a cellular network, the Internet, or a combination thereof. For example, network 106 may include a mobile network that is communicatively coupled to a private network, sometimes referred to as an intranet, that provides various ancillary services, such as communication with various databases, the Internet, and cloud 120.

For discussion purposes, different user/electronic/computing devices (e.g., 102(1) to 102(N)) appear in the drawing, to represent some examples of the client devices that may be used by a user (e.g., 101(1) to 101(N)) to communicate over network 106. Today, user devices typically take the form of portable handsets, smart-phones, tablet computers, desktop computers, personal digital assistants (PDAs), and smart watches, although they may be implemented in other form factors, including consumer, medical, and business electronic devices.

Data repository 112 and/or server 116 is configured to store one or more algorithms including machine learning techniques, such as artificial intelligence, natural language processing, neural networks, deep reinforcement learning models, and the like. Further, data repository may store training data 113. In some examples, training data 113 may include requests of previous electronic data packages 105(1)-105(N), reward functions for deep reinforcement learning models and corresponding computing environment status and actions taken, previously generated and verified policies and the conditions relevant, and so on.

Server 116 may comprise a group of computing resources that cluster scaling system 103. Cluster scaling system 103 may have four main modules for using machine learning techniques to generate and apply a policy for allocation of computing resources (e.g., scaling clusters) between multiple computational workloads. There may be a scaling module 104 that is operative to scale computing clusters according to a generated and verified policy; a policy generator 107 that generates a policy; a policy verifier 108 that is operative to verify the policy; an accounting database 109 that is operative to account for computing resources within the computing environment; and a priority database 110 that is operative to record a priority of each user account assigned computing resources within the computing environment. Cluster scaling system 103 may include additional modules as discussed in more detail below. In some examples, accounting database 109 and priority database 110 are within data repository 112 and server 116 interacts with databases 109 and 110 via network 106.

While data repository 112 and server 116 and computing devices 102(1)-102(N) are illustrated by way of example to be on different platforms, it will be understood that, in different embodiments, these platforms may be combined in different combinations. In other embodiments, one or more of these computing platforms may be implemented by virtual computing devices in the form of virtual machines or software containers that are hosted in the cloud 120, thereby providing an elastic architecture for processing and storage. The cloud is discussed in more detail later.

Example System

Figure 2:
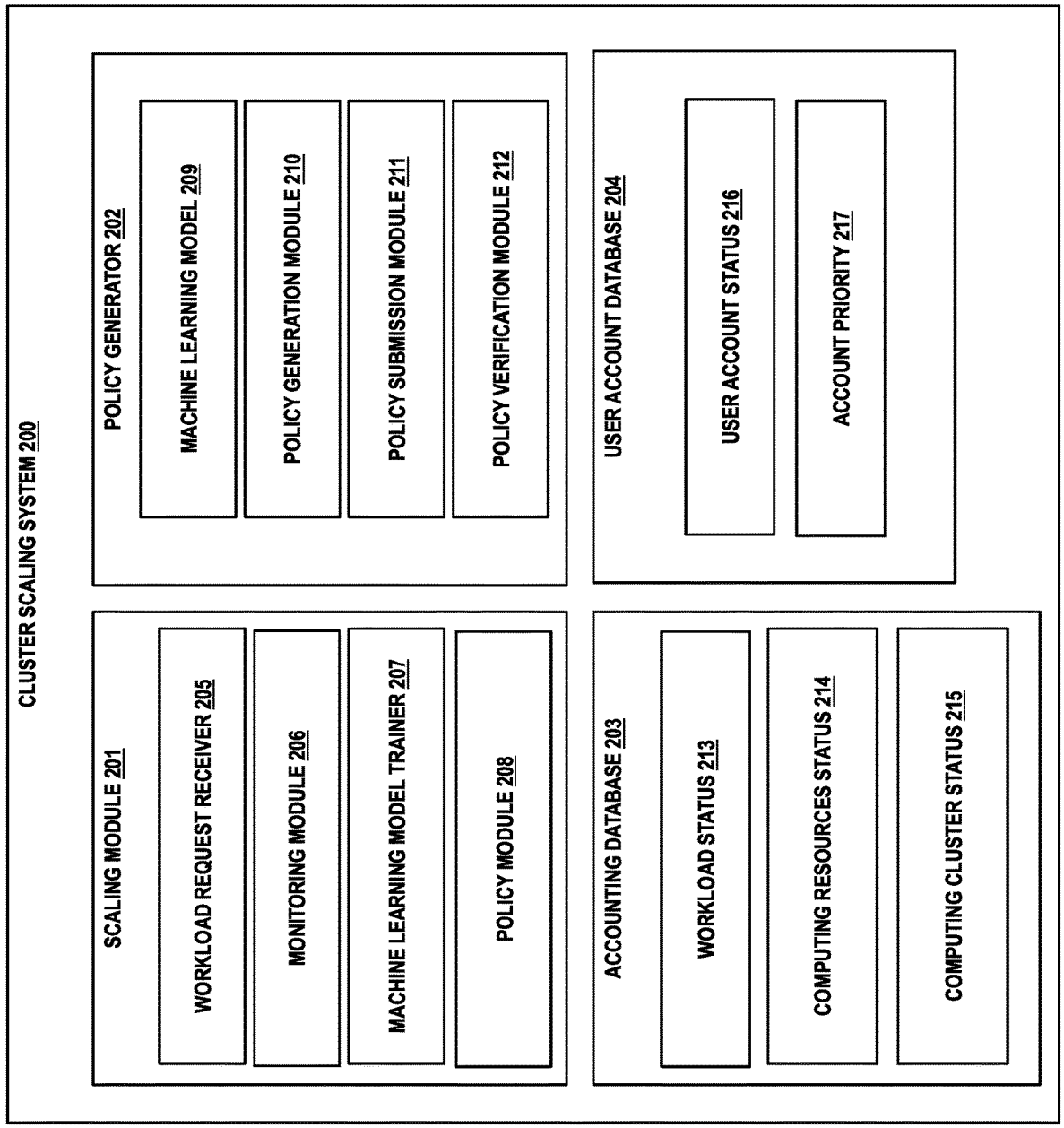
FIG. 2 is a block diagram illustrating an example architecture of a cluster scaling system, consistent with an illustrative embodiment.

FIG. 2 is a conceptual block diagram of a cluster scaling system 200 (e.g., cluster scaling system 103 of FIG. 1). Cluster scaling system 200 includes a scaling module 201 (e.g., scaling module 104 of FIG. 1), a policy generator 202 (e.g., policy generator 107 of FIG. 1), an accounting database 203 (e.g., accounting database 109 of FIG. 1), and a priority database 204 (e.g., priority database 110 of FIG. 1).

Scaling module 201 may include a workload request receiver 205, a monitoring module 206, a machine learning model applier 207, and a policy module 208. The workload request receiver 205 may be operative to capture the request to accommodate a particular workload. For example, workload request receiver 205 may receive electronic data packages 105(1)-(N) from one or more users 101(1)-(N) using any of electronic devices 102(1)-(N). Monitoring module 206 may monitor any actions within the cloud infrastructure and store the actions for use as training data (e.g., training data 113) to use for training machine learning model 209. Machine learning model trainer 207 may train machine learning model using training data 113 so that machine learning model can accurately determine a particular action to take given a particular state of the cloud infrastructure and on reward for taking the particular action, as discussed below with reference to at least FIG. 5. Policy module 208 may apply a verified policy in response to verifying a generated policy outputted from applying machine learning model 209.

Policy generator 202 includes a machine learning model 209 (e.g., a deep reinforcement learning model), policy generation module 210, a policy submission module 211, and a policy verification module 212. In some embodiments, policy generation module 210, applies machine learning model 209 to generate a policy for computing resource allocation between one or more computing clusters within the cloud infrastructure. Policy submission module 211 submits the generated policy for verification by, e.g., a cloud infrastructure technician or policy verification module 212. Policy verification module 212 may verify the policy based on whether the policy satisfies a threshold based on a predetermined criteria, as discussed below.

Accounting database 203 may include a workload status 213, a computing resource status 214, and a computing cluster status 215. The workload status 213 may have a table including a status of each workload within the cloud infrastructure. Computing resource status 214 may have a table including an amount of computing resources (e.g., memory, computing processing units, graphical processing units, and so on) within the cloud infrastructure and whether the computing resources are available or executing tasks. Computing cluster status 215 may have a table including a list of computing clusters within the cloud infrastructure and associated workloads for each cluster.

User account database 204 includes a user account status 216, an account priority 217, and a priority criteria 218. User account status 216 may include a listing of each workload and a corresponding cluster assigned to execute the workload. Account priority 217 may include a priority designation (designated priority) for each user, e.g., low priority, medium priority, high priority, and so on. The user account status 216 and account priority 217 are discussed in more detail with reference to FIGS. 3 and 5-8.

Figure 3:
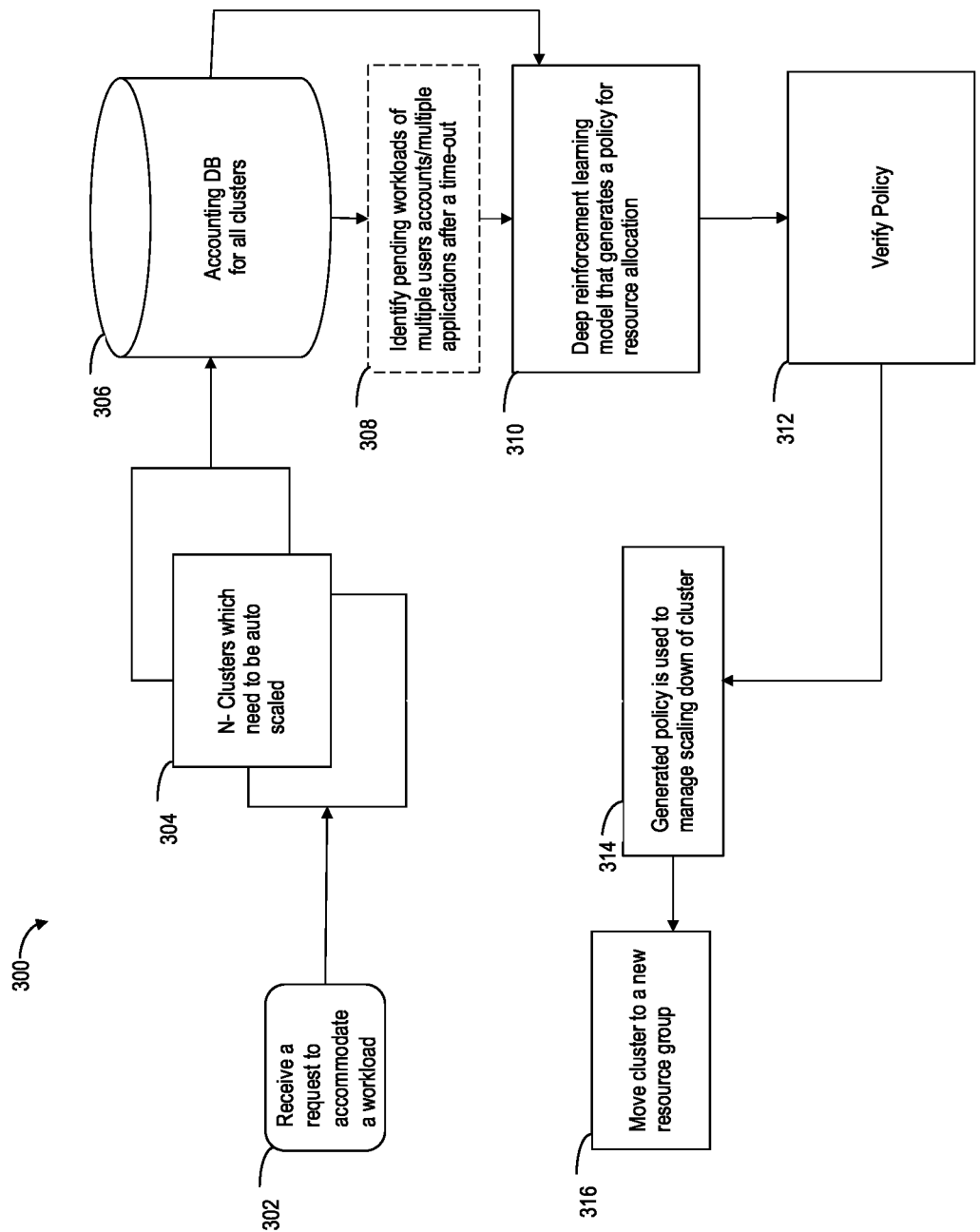
FIG. 3 is a flow diagram illustrating a process of allocating computing resources according to a verified policy generated using machine learning techniques, consistent with an illustrative embodiment.

FIG. 3 is a system diagram illustrating a process for generating a policy for allocation of resources within a cloud infrastructure, according to an embodiment of the present disclosure. As depicted in FIG. 3, the flow diagram 300 may begin with block 302 where the computing system receives a request to accommodate a particular workload or task. In one example of block 302, user 101(1) submits a request (e.g., in the form of an electronic package 105(1)) via an electronic device 102(1) to cluster scaling system 103. In one example of block 302, the computing system may determine computing resources (e.g., memory, processing power, and the like) involved to accommodate the particular workload and an associated time for completion. In one example of block 302, the workload or task is associated with a user account.

In block 304, the computing system may identify each cluster operating within the computing environment that is available for auto-scaling. In block 306, the computing system references an accounting database (e.g., accounting database 109, 203) to determine the status for each cluster available for autoscaling. In examples, the accounting database 203 may include a list of computing resources (e.g., computing resource status 214) consumed by each individual cluster. For example, computing resource status 214 may include a number of nodes within each cluster and corresponding computing resources (e.g., memory, processing power, and so on) within each cluster. For example, accounting database 203 stores a current status of all cluster usage details (e.g., within computing cluster status), such as the minimum number of nodes within each cluster, maximum number of nodes within each cluster, memory of each node within each cluster, central processing unit within each node within each cluster, graphical processing unit within each node within each cluster, and so on. For example, the policy incorporates management of limits for each cluster, such as a minimum number of nodes and a maximum number of nodes required to complete pending workloads for all available clusters (e.g., stored within workload status 213).

In one example of flow diagram 300, at block 308, the computing system identifies pending workloads (e.g., workload status 213) of multiple user accounts or multiple applications that clusters are assigned to complete and determines an amount of time remaining on each current assigned workload. In some examples, the computing system references the accounting database 203 to analyze the status of each cluster within the accounting database 203 every set amount of time, e.g., every minute, five minutes, ten minutes, and so on.

Flow diagram 300, block 310, may include computing system invoking a deep reinforcement learning model that generates a policy for allocation of computing resources between multiple workloads associated with multiple user accounts. Training deep reinforcement learning model is discussed in more detail with reference to at least FIG. 5. Specifically, the actions taken to upscale or downscale particular clusters according to a reward function and a state of the computing environment (e.g., cloud infrastructure) are discussed in more detail with reference to table 500 of FIG. 5.

In block 312, the computing system may verify the policy according to a predetermined criteria. To determine the policy can achieve an objective (e.g., discussed herein as a "optimization objective"), a verification (e.g., a manual verification) is used on the policy. The policy verification can act as a safeguard from invoking a policy that works well in theory (e.g., bases strictly on a mathematical representation) but can result in poor resource allocation. For example, a policy verification may restrict a policy that downscales a computing cluster with only ten nodes (which may be referred to as agents, nodes, and so on) when one hundred clusters are required and there are clusters with hundreds of nodes available for downscaling without interfering with the corresponding workloads. Policy verification module 212 may ensure no workloads are unnecessarily terminated, especially those associated with a high-priority user account, based on a generated policy.

Policy verification module 212 monitors and stores (e.g., within accounting database 203) a record of the cluster(s) (e.g., in computing cluster status 215) that the policy directs to scale down and a number of impacted clusters after the clusters have been scaled-down. If a number of the scaled-down cluster exceeds a predetermined threshold, then the policy may select another cluster to allocate resources from to the cluster requiring resources to complete the requested workload. For example, the predetermined threshold may be adjusted based on a number of high-priority, medium-priority, low-priority, and so on, clusters occupying a current computing resource group. Using an adjustable threshold allows clusters to occupy an account/resource group, thereby providing automatic granularity. The predetermined threshold may verify an upscaling speed for the cluster requiring scaling to ensure a cluster associated with a high-priority user account received computing resources more quickly than a cluster associated with a low-priority user account.

At block 312, the computing system receives the generated, verified policy and, at block 314, applies the generated policy across the cloud infrastructure for efficient down scaling with respect to multiple clusters. In one example of block 314, the generated, verified policy is used to manage scaling down of at least one cluster. For example, policy module 208 may receive the generated, verified policy and manage allocation of resources between workloads and their associated clusters and user accounts.

Figure 4:
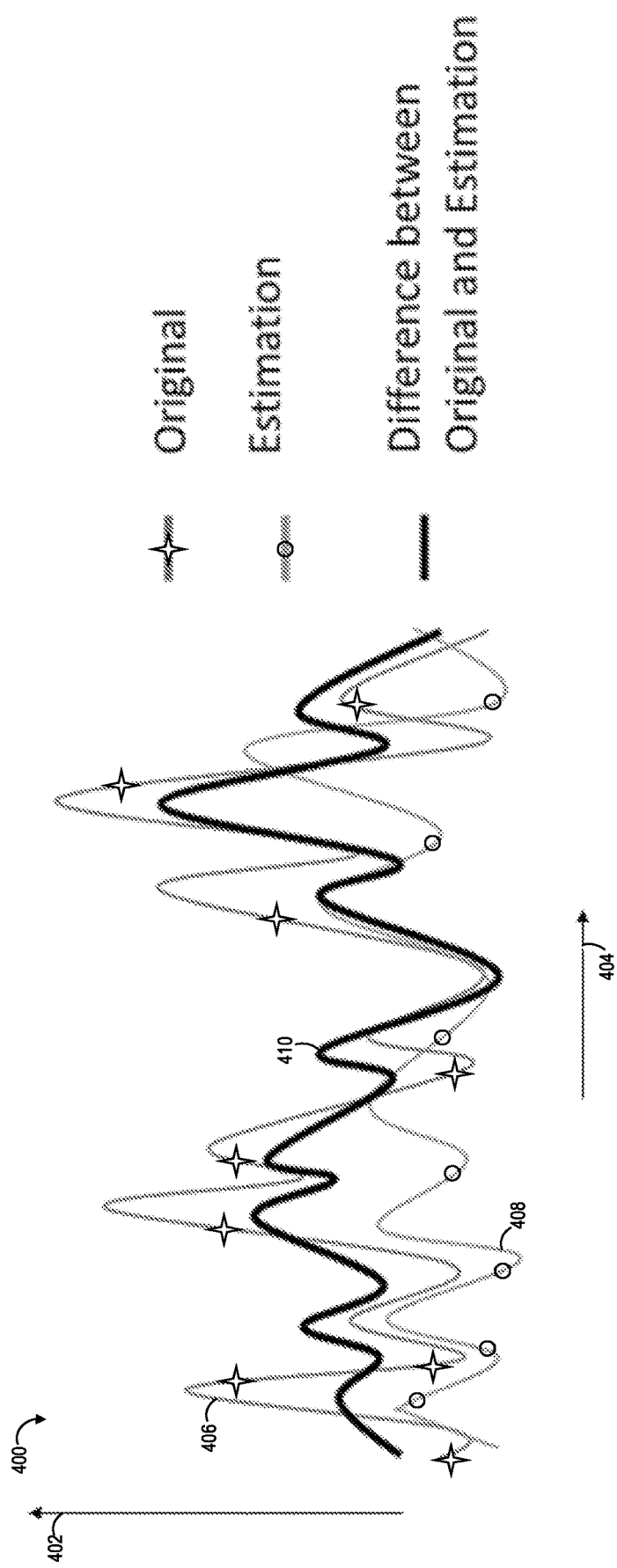
FIG. 4 is an exemplary graph illustrating a sample trained model inference performance of scaling computing resources from clusters, consistent with an illustrative embodiment.

FIG. 4 is a graph 400 of a sample trained model inference performance of scaling clusters within a cloud infrastructure, consistent with an illustrative embodiment. Graph 400 maps the number of sequences of training a machine learning model, along axis 404, as a function of the threshold (e.g., maximum) computing resources allocated from a particular computing cluster without impacting a current workload the cluster is tasked with, along an axis 402. Original line 406 maps a theoretical model of a machine learning model (e.g., deep reinforcement learning model) within the cloud infrastructure, estimation line 408 maps a trained machine learning model (e.g., a trained deep reinforcement learning model), and difference line 410 maps the difference between original line 406 and estimated line 408. Graph 400 shows that as training increases (e.g., scaling cluster system 200 trains machine learning model 209 using training data 113) and the number of sequences of training increases, the machine learning model increases accuracy of decision making (i.e., actions) given a particular cloud infrastructure state and reward function for a given action.

FIG. 5 is an exemplary table illustrating example parameters for training a machine learning model, according to technical aspects of the present disclosure. In examples, table 500 may be stored within accounting database 203, and may comprise the collective data stored within any of workload status 213, computing resources status 214, and computing cluster status 215. For example, table 500 may further include information stored within priority database 204, such as user account status 216, user account priority 217, and so on. Table 500 may be modified according to preferred parameters for the machine learning model. For example, when training a deep reinforcement learning model, determining an action may depend on the state of a cloud infrastructure and specific rewards for actions taken. The state may be represented by the collective data included within table 500, selected as preferred parameters from all information included within accounting database 203 and priority database 204. The trained deep reinforcement learning model may be shaped according to what is selected as parameters within table 500.

In some examples, a user account may have an associated user identification (ID), such as "1234," "5678," "91011," and so on. Table 500 may further include a "workload type," that includes the specific type of workload the cluster for a particular workload is executing, such as "train," "inference," "CPU," and so on. Table 500 may further include the determined maximum and minimum threshold number of nodes (e.g., nodes or agents within a cluster associated with the user ID) involved to execute the workload, which may be any numerical value, such as "10," "20," "100," and so on. Table 500 may further include a time duration for executing the workload, which may be represented in any units, such as minutes. In addition to the different threshold (e.g., maximum or minimum) number of nodes involved to execute a workload, table 500 may further include the threshold (e.g., maximum and/or minimum) number of computing resources involved to execute the workload. The computing resources may include computing processing units (i.e., CPU), memory, and the like.

Table 500 may further include an account priority that may be ranked on any scale, such as a numerical scale (e.g., one through ten) or as low through high. The ranked scale may be as granular as a user or the system desires for training the deep reinforcement learning model, for example, one through ten, one through a thousand, and so on. The priority may depend on a number of factors, for example, a user paying for a subscription for access to the cloud infrastructure (e.g., a thousand dollar a month subscription provides a high priority, a one hundred dollar a month subscription provides a medium priority, a free subscription provides a low priority, and the like).

Table 500 may further include a quantity of agents for each user ID. Table 500 may further include a name of an application used by user ID to carry out the workload. For example, the application name, as shown within table 500, may include "ray," "pytorch-nlp," "game," and so on.

According to one embodiment, a trained deep reinforcement learning model (e.g., machine learning model 209) receives application scaling requirements from multiple competing workloads, tasks, or applications competing computing resources for a single user account. For example, a computing system (e.g., cluster scaling system 200) receives the application scaling considerations responsive to a received auto scalable cluster (e.g., block 302) within the cloud infrastructure. Scaling a cluster associated with the user account may depend on a predetermined optimization objective (i.e., reward function designed), user account priority, and scaling clusters associated with other user accounts based on not significantly impacting workload performance (e.g., downscaling resources from a cluster where the downscale leads to abandonment of the workload).

Responsive to policy generation module 210 generating a policy based on the parameters comprising table 500 for the optimization objective, policy verification module 212 verifies the policy with checks, such as thresholds such as a maximum limit for upscaling a cluster associated with a particular user account; a minimum limit for downscaling one or more clusters associated with a particular user account so that the workloads do not halt; a total number of impacted clusters relating to a particular computing resource group. Once the policy is verified, downscaling clusters associated with particular user accounts occurs, prioritizing user accounts with higher account priorities (e.g., medium and high relative to low). After the workloads from prioritized user accounts have been executed, computing resources may be returned to the other clusters.

In some examples, each datum listed within table 500 may be considered by the machine learning model when determining a state of the cloud infrastructure. For example, an action taken for downscaling or upscaling a cluster that advances the optimization objective will result in a reward. For example, upscaling or downscaling (i.e., an action) computing resources, such as computer processing units, graphical processing units, memory, and so on, for a particular cluster are determined based in part according to a reward function that may be based on whether downscaling computing resources may result in workload termination and/or based on an account priority. A reward function may determine whether a particular action is deemed positive or negative for a particular state of the cloud infrastructure. The optimization objective when training the deep reinforcement learning model is to generate high rewards based on workload associated with particular user accounts, account priority, a maximum and minimum number of nodes for executing a particular workload, and so on.

For example, a reward may be represented in the form of an integer value, such as a positive "1" for allocating computing resources to a computing cluster associated with a high-priority user account as opposed to a computing cluster associated with a lower-priority user account. For example, if a request to accommodate a workload is associated a high-priority account and the computing system determines the high-priority user account involves additional computing resources, downscaling a cluster associated with "user 91011," rather than clusters associated with either "user 5678" or "user 91011," may result in a positive reward for the machine learning model to take the particular action.

For example, a reward may be a negative "1" for allocating computing resources from a computing cluster associated with a high-priority user account to a computing cluster associated with low-priority user account. For example, if a request to accommodate a workload is associated with a high-priority account and the computing system determines the high-priority user account involves additional computing resources, downscaling a cluster associated with either "user 5678" or "user 91011," "user 91011," rather than clusters associated with "user 91011," may result in a negative reward for the machine learning model to take that particular action.

In some examples, a reward may be a positive "1" for autoscaling a cluster having a workload based on node startup times. A graphical processing unit (GPU) cluster may be gigabytes (GBs) and may involve retrieving a dataset to initiate a node for machine learning training. Retrieving images for the GPU cluster (or virtual machine or containers) and getting the dataset can be time-intensive. The reward function may reward actions taken that select nodes based on node startup times or the time it takes to spawn a usable node or cluster.

Likewise, a reward function may reward a positive "1" for selecting a workload based on a cost associated with the workload of a particular cluster, which may be referenced in accounting database 203 or user account database 204. For example, a reward of "1" may be given for taking an action that results with allocating computing resources to a cluster with a higher allocated budget than a cluster having a workload associated with a lower allocated budget.

As an additional example, a reward may be a negative "1" for allocating computing resources away from a computing cluster associated with a high-priority user account when a workload has a low duration in time (e.g., less than a minute to complete a workload) involved for execution. For example, downscaling computing clusters associated with a higher-priority user account, with a workload having a short time to completion, may result in a negative reward when the request is associated with a lower-priority user account.

Likewise, a reward function may be based on a deadline for completing a workload. For example, each cluster may have a corresponding deadline to complete the workload. The reward function may reward an action with a positive "1" for allocating computing resources, from a clusters having a deadline of three days to complete a corresponding workload, to a cluster having a deadline of a day to complete a corresponding workload.

A reward may be a "0" for autoscaling computing resources away from a computing cluster associated with a low-priority user account when there is no demand for computing resources for clusters associated with high-priority user accounts.

In addition, the reward function may produce a negative reward if an action results in downscaling beyond the minimum or maximum threshold number of nodes. For example, if "user ID" has 9 nodes within a cluster, the deep reinforcement learning model may be negatively rewarded when downscaling, e.g., all 9 nodes, to upscale a cluster requiring 90 nodes, rather than taking the nodes from a cluster (e.g., a cluster with 100 nodes and a minimum node threshold of 10 nodes) that can lose the number of nodes, while staying within the minimum and maximum thresholds.

The reward function is not limited to the above examples or specific rewards (e.g., −1, 0, and 1), and can be any numerical value to reward an action that furthers the optimization objective of allocating computing resources between clusters, virtual machines, or containers.

Figure 6:
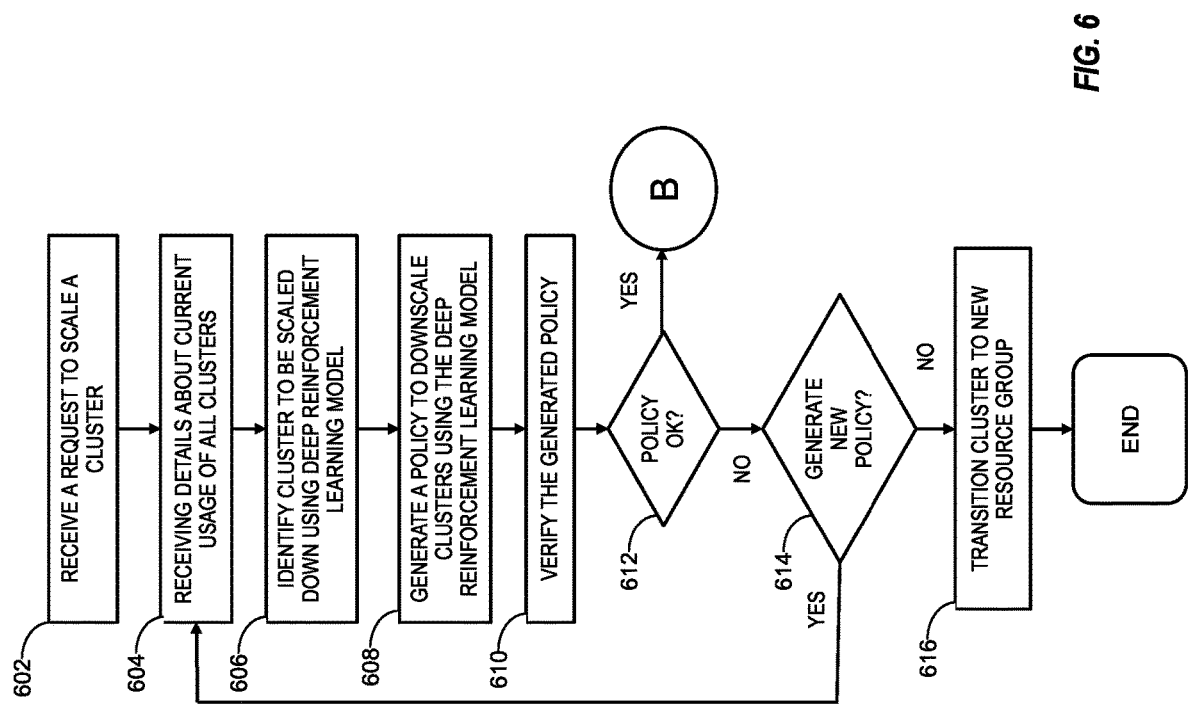
FIG. 6 is a flowchart illustrating a method for using machine learning techniques to allocate resources between multiple clusters, consistent with an illustrative embodiment.

FIG. 6 is a flowchart illustrating a method for using machine learning techniques to allocate resources between multiple clusters, e.g., within a cloud infrastructure. Method 600 include receiving (602) a request (e.g., user-submitted request) to accommodate a particular workload by scaling a cluster executing the workload. In one example of block 602, cluster scaling system 103 receives a user 101(1) request, from an electronic device 102(1), in the form of an electronic package 105(1), over network 106. In one example, the particular workload is to execute an application running on a cloud infrastructure.

Method 600 includes receiving (604) (e.g., from a database) details about current usage or status of all clusters within the cloud infrastructure. In one example of block 604, cluster scaling system 103 retrieves computing resource details (e.g., workload status 213, computing resources status 214, computing cluster status 215, and so on) from accounting database 109. Method 600 includes identifying (606), based on retrieved computing resource details, which clusters can be downscaled using a trained deep reinforcement learning model.

Method 600 further includes generating (608) a policy to downscale at least one of the identified clusters according to the trained deep reinforcement learning model. In one example of block 608, policy generation module 211 generates the policy responsive to machine learning model applier 207 applying machine learning model 209 to the computing resource details retrieved from accounting database 109 and based on data from priority database (e.g., user account status, user account priority, and so on). Method 600 may include verifying (610) the generated policy, as described above with reference to at least FIGS. 3-5. In one example of block 610, policy verification module 212 verifies the generated policy.

Method 600 further includes determining whether the generated policy satisfies a threshold based on a predetermined criteria. In one example, determining whether a threshold based on the predetermined criteria is satisfied may include all, a majority, or some amount of the predetermined criteria occurs. For example, the predetermined criteria may include that no current workloads are terminated once the policy is applied; that downscaling of clusters associated with low-priority user accounts is more likely than downscaling of clusters associated with high-priority user accounts; that upscaling speed for a particular submitted request is quicker for high-priority user accounts than low-priority user accounts; and so on. In some examples, the scaling cluster system 200 may automatically, or a cloud infrastructure administrator may manually, adjust the threshold and/or the predetermined criteria.

Method 600 may proceed to determine (614) whether to generate a new policy, if the threshold is not satisfied (decision: "NO"). However, if the threshold is satisfied (decision: "YES"), method 600 may proceed to "B," where the method is continued.

At decision block 614, if it is determined a new policy should not be generated, method 600 transitions (616) the cluster requiring upscaling based on the request, from the current resource group the cluster is occupying, to occupy a new resource group within the cloud infrastructure. For example, a resource group may be a new account in an existing or new cloud service provider which has cloud services configured to be used by on-boarded users. For example, the new resource group may have another set of computing resources within one or more clusters that are occupying the new resource group and that are executing workloads associated with other user accounts. However, if, at decision block 614 (decision: "NO"), it is determined a new policy should be generated, method 600 proceeds to block 604, where details about the current cluster usage of all clusters are retrieved.

In one example of determining to generate a new policy, policy verification module 212 considers factors, including disruption caused to the identified set of computing clusters based on allocating computing resources from the identified set of computing clusters to the one cluster. For example, if a specific user account has 100 computing clusters running allocating computing resources causes all of the 100 clusters to release computing resources, then the generated policy may be rejected as it is causing disruption to all the computing clusters.

Figure 7:
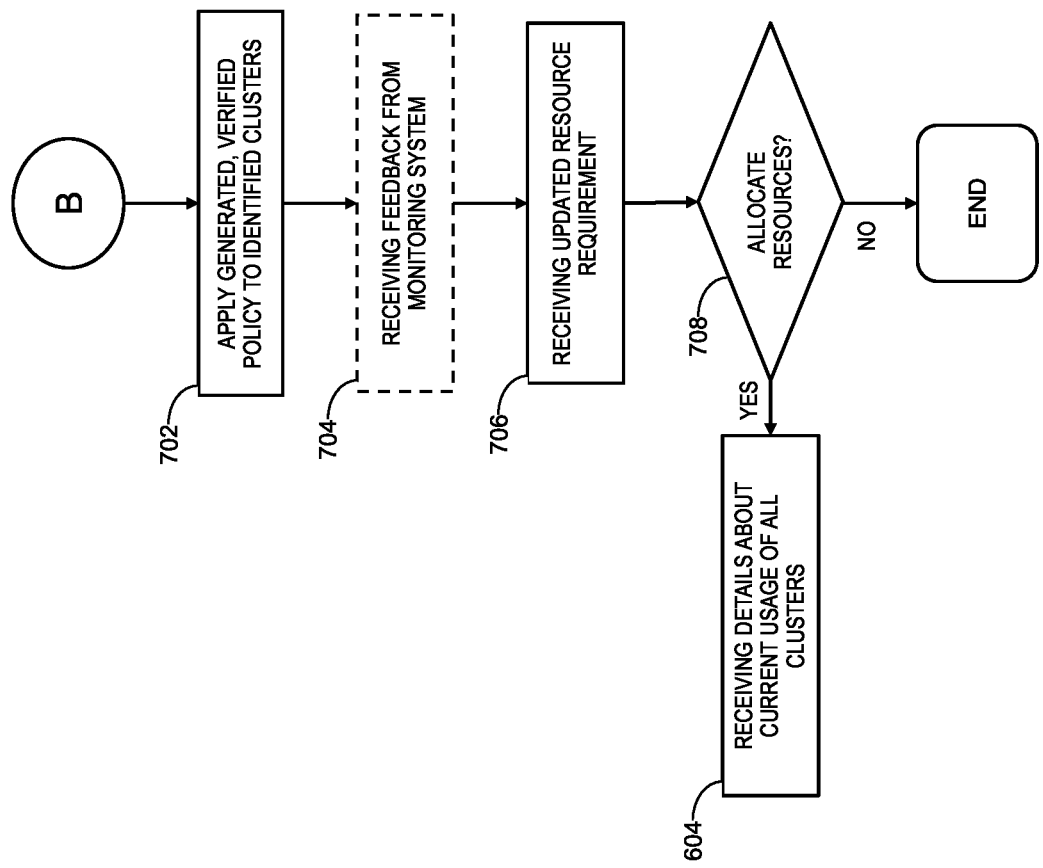
FIG. 7 is a continuation of the flowchart of FIG. 6 illustrating the method for using machine learning techniques to allocate resources between multiple clusters, consistent with an illustrative embodiment.

FIG. 7 is a continuation of the flowchart of FIG. 6 illustrating a method for using machine learning techniques to allocate resources between multiple clusters within, e.g., the cloud infrastructure. Method 700 may begin at "B," where the policy has been verified, at decision block 612, based on the policy threshold being satisfied. Method 700 includes applying (702) the generated, verified policy to the identified clusters. In one example of block 702, policy module 208 applies the policy to the identified clusters by scaling computing resources between the identified clusters (e.g., moving nodes having specific computing resources from one or more clusters) and the cluster requiring computing resources based on the generated, verified policy.

Method 700 includes an optional block 704 that includes receiving feedback from a monitoring system (e.g., monitoring module 208). In one example of block 704, monitoring module 208 may collect computing resource usage metrics, such as CPU usage, memory usage, GPU usage, and so on, that may be used to borrow resources from the identified set of clusters determined by the policy to be scaled down.

In one example of block 704, cluster scaling system 103 transmits information related to computing resource allocation performed in block 702 to a monitoring system (e.g., monitoring module 206). In the example of block 704, the monitoring system may store some or all of the information related to the allocation as well as the generated policy. For example, the monitoring module 206 may store the information within data repository 112 and can be used as training data 113. In examples, monitoring module 206 may categorize the information according to action, state, and associated reward function for use as training data 113 for retraining the machine learning model 209. In some examples, monitoring module 206 may provide feedback regarding the generated policy.

Method 700 includes receiving (706) an updated resource requirement for the workload or a new workload for the cluster associated with the submitted request. Method 700 may include determining (708) whether to allocate additional computing resources to satisfy the demand of the workload or new workload requirement. Determining whether to allocate additional computing resources may include determining whether the workload or new workload may be completed within a period of time (e.g., a few seconds, a minute, an hour, and so on); whether there are insufficient computing resources to complete the workload or new workload; and so on.

Method 700 may end upon determining (decision: "NO") not to allocate additional computing resources. However, if the it is determined (decision: "YES") additional computing resources are required to satisfy the demand of the workload or the new workload, method 600 may return to block 604.

Figure 8:
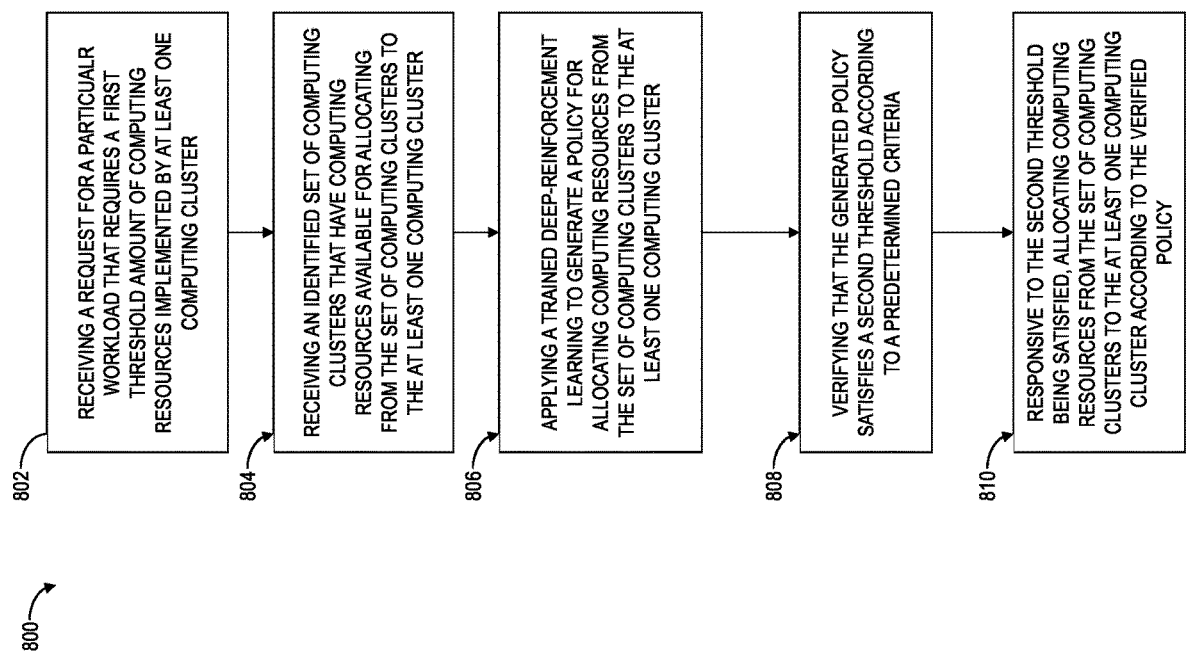
FIG. 8 is a flowchart illustrating a method for scaling down a first cluster within a cloud infrastructure to allocate computing resources to a second cluster, consistent with an illustrative embodiment.

FIG. 8 is a flowchart illustrating a method for scaling down a first cluster within a cloud infrastructure to allocate computing resources to a second cluster within the cloud infrastructure. Method 800 may include receiving (802) a request for a particular workload that involves a first threshold amount of computing resources implemented by at least one computing cluster. Method 800 may further include receiving (804) (e.g., from a database) an identified a set of computing clusters that have computing resources available for allocating from the set of computing clusters to the at least one computing cluster. Method 800 may further include applying (806) a trained deep-reinforcement learning model to generate a policy for allocating the computing resources from the set of computing clusters to the at least one computing cluster. Method 800 may include verifying (808) that the generated policy satisfies a second threshold according to a predetermined criteria. Method 800 further includes allocating (810) the computing resources from the set of computing clusters to the at least one computing cluster according to the verified policy in response to the second threshold being satisfied.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
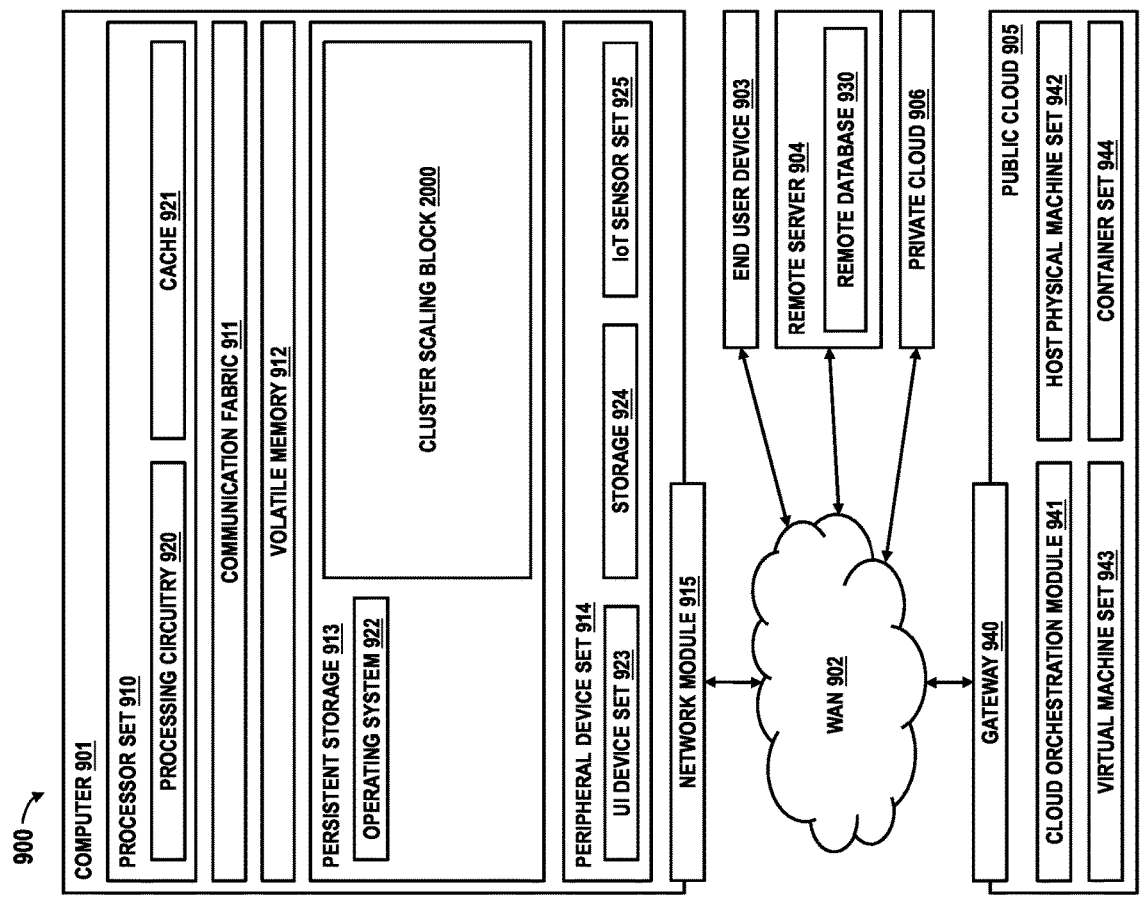
FIG. 9 is a block diagram illustrating an example computing environment, consistent with an illustrative embodiment.

Computing environment 900 of FIG. 9 contains an example of an environment for the execution of at least some of the computer code involved in performing the inventive methods, such as cluster scaling block 2000 that includes instructions that, when executed, cause processing circuitry 920 to generate a policy using a trained machine learning model for allocating computing resources between computing clusters (as discussed with reference to FIGS. 1-8). In addition to block 2000, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 2000, as identified above), peripheral device set 914 (including user interface (UI) device set 923, storage 924, and Internet of Things (IOT) sensor set 925), and network module 915. Remote server 904 includes remote database 930. Public cloud 905 includes gateway 940, cloud orchestration module 941, host physical machine set 942, virtual machine set 943, container set 944, and a cluster set (not shown in FIG. 9, discussed above with reference to FIGS. 1-8).

Computer 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

Processor set 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 2000 in persistent storage 913.

Communication fabric 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

Persistent storage 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid-state storage devices. Operating system 922 may take several forms, such as various known proprietary operating systems or open-source Portable Operating System Interface-type operating systems that employ a kernel. The code included in block 2000 typically includes at least some of the computer code involved in performing the inventive methods.

Peripheral device set 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

Network module 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

Wireless area network (WAN) 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer/electronic devices 102(1)-(N). For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

Remote server 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

Public cloud 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, comprising:
   receiving, by a computing system, a request to accommodate a particular workload that involves a first threshold amount of computing resources implemented by at least one computing cluster;
   receiving, from a database, an identified set of computing clusters that have computing resources available for allocating from the identified set of computing clusters to the at least one computing cluster to satisfy the first threshold amount of computing resources;
   applying a trained deep-reinforcement learning model to generate a policy for allocating the available computing resources from the identified set of computing clusters to the at least one computing cluster;
   verifying, by the computing system, that the generated policy satisfies a second threshold according to a predetermined criteria; and
   responsive to the second threshold being satisfied, allocating, by the computing system, according to the verified policy, the computing resources from the set of computing clusters to the at least one computing cluster.

2. The method of claim 1, wherein allocating the available computing resources from the identified set of computing clusters to the at least one computing cluster comprises scaling down computing resources of the set of computing clusters while scaling up the computing resources implemented by the at least one computing cluster.

3. The method of claim 1, wherein receiving the identified set of computing clusters further comprises receiving, by the computing system, a workload status and computing resources status associated with every computing cluster operating within a cloud infrastructure.

4. The method of claim 1, further comprising receiving automated feedback regarding computing resource usage metrics related to allocating computing resources according to the verified policy.

5. The method of claim 1, further comprising responsive to the second threshold not being satisfied, reapplying the trained deep-reinforcement learning model to another identified set of computing clusters to generate another policy for allocating computing resources from the another identified set of computing clusters to the at least one computing cluster.

6. The method of claim 1, wherein the at least one computing cluster is occupying a current resource group, the method further comprising responsive to the second threshold not being satisfied, transitioning the at least one computing cluster from occupying the current resource group to another resource group having another set of computing resources available.

7. The method of claim 1, wherein:
the received request to accommodate the particular workload having a first designated priority,
each computing cluster of the identified set of computing clusters is associated with at least one other user account, each one other user account having a second designated priority lower than the first designated priority, and
the predetermined criteria include determining whether the generated policy allocates resources from computing clusters of the set of computing clusters associated with the at least one other user account to the at least one computing cluster associated with the user account.

8. A computing system comprising:
a processor;
a storage device coupled to the processor;
program instructions stored in the storage device, wherein an execution of the program instructions by the processor configures the processor to perform acts comprising:
receiving a request to accommodate a particular workload that involves a first threshold amount of computing resources implemented by at least one computing cluster;
receiving, from a database, an identified a set of computing clusters that have computing resources available for allocating from the identified set of computing clusters to the at least one computing cluster to satisfy the first threshold amount of computing resources;
applying a trained deep-reinforcement learning model to generate a policy for allocating the available computing resources from the identified set of computing clusters to the at least one computing cluster;
verifying that the generated policy satisfies a second threshold according to a predetermined criteria; and
responsive to the second threshold being satisfied, allocating according to the verified policy, the computing resources from the set of computing clusters to the at least one computing cluster.

9. The computing system of claim 8, wherein allocating the available computing resources from the identified set of computing clusters to the at least one computing cluster comprises scaling down computing resources of the set of computing clusters while scaling up the computing resources implemented by the at least one computing cluster.

10. The computing system of claim 8, wherein receiving the identified set of computing clusters further comprises receiving a workload status and computing resources status associated with every computing cluster operating within a cloud infrastructure.

11. The computing system of claim 8, wherein execution of the program instructions by the processor configures the processor to perform acts further comprising receiving automated feedback regarding computing resource usage metrics related to allocating computing resources according to the verified policy.

12. The computing system of claim 8, wherein execution of the program instructions by the processor configures the processor to perform acts further comprising, responsive to the second threshold not being satisfied, reapplying the trained deep-reinforcement learning model to another identified set of computing clusters to generate another policy for allocating computing resources from the another identified set of computing clusters to the at least one computing cluster.

13. The computing system of claim 8, wherein the at least one computing cluster occupies a current resource group, wherein execution of the program instructions by the processor configures the processor to perform acts further comprising responsive to the second threshold not being satisfied, transitioning the at least one computing cluster from occupying the current resource group to another resource group having another set of computing resources available.

14. The computing system of claim 8, wherein:
the received request to accommodate the particular workload having a first designated priority,
each computing cluster of the identified set of computing clusters is associated with at least one other user account, each one other user account having a second designated priority lower than the first designated priority, and
the predetermined criteria include determining whether the generated policy allocates resources from computing clusters of the set of computing clusters associated with the at least one other user account to the at least one computing cluster associated with the user account.

15. A computer program product comprising:
one or more non-transitory computer-readable storage devices and program instructions stored on at least one of the one or more non-transitory storage devices, the program instructions executable by a processor, the program instructions comprising instructions to:
receive, by the processor, a request to accommodate a particular workload that involves a first threshold amount of computing resources implemented by at least one computing cluster;
receiving, from a database, an identified set of computing clusters that have computing resources available for allocating from the identified set of computing clusters to the at least one computing cluster to satisfy the first threshold amount of computing resources;
apply a trained deep-reinforcement learning model to generate a policy for allocating the available computing resources from the identified set of computing clusters to the at least one computing cluster;

verify, by the processor, that the generated policy satisfies a second threshold according to a predetermined criteria; and responsive to the second threshold being satisfied, allocate, according to the verified policy, the computing resources from the set of computing clusters to the at least one computing cluster.

16. The computer program product of claim 15, wherein allocating the available computing resources from the identified set of computing clusters to the at least one computing cluster comprises scaling down computing resources of the set of computing clusters while scaling up the computing resources implemented by the at least one computing cluster.

17. The computer program product of claim 15, wherein receiving the identified set of computing clusters further comprises receiving, by the processor, a workload status and computing resources status associated with every computing cluster operating within a cloud infrastructure.

18. The computer program product of claim 15, wherein the program instructions comprise further instructions to receive automated feedback regarding computing resource usage metrics related to allocating computing resources according to the verified policy.

19. The computer program product of claim 15, wherein the program instructions comprise further instructions to, responsive to the second threshold not being satisfied, reapply the trained deep-reinforcement learning model to another identified set of computing clusters to generate another policy for allocating computing resources from another identified set of computing clusters to the at least one computing cluster.

20. The computer program product of claim 15, wherein:
the received request to accommodate the particular workload having a first designated priority,
each computing cluster of the identified set of computing clusters is associated with at least one other user account, each one other user account having a second designated priority lower than the first designated priority, and
the predetermined criteria include determining whether the generated policy allocates resources from computing clusters of the set of computing clusters associated with the at least one other user account to the at least one computing cluster associated with the user account.

* * * * *